United States Patent
Kawai et al.

(10) Patent No.: US 11,435,961 B2
(45) Date of Patent: Sep. 6, 2022

(54) IMAGE PROCESSING APPARATUS, IMAGE PROCESSING METHOD, CONTROL APPARATUS, CONTROL METHOD, AND STORAGE MEDIUM THAT DISPLAY CONVERTED IMAGE DATA WHOSE MAXIMUM LUMINANCE HAS BEEN SET ACCORDING TO AN OBTAINED LIGHTING LUMINANCE

(71) Applicant: CANON KABUSHIKI KAISHA, Tokyo (JP)

(72) Inventors: Yoshinori Kawai, Matsudo (JP); Tetsuya Suwa, Yokohama (JP); Hidetsugu Kagawa, Kawasaki (JP)

(73) Assignee: Canon Kabushiki Kaisha, Toyko (JP)

( * ) Notice: Subject to any disclaimer, the term of this patent is extended or adjusted under 35 U.S.C. 154(b) by 0 days.

(21) Appl. No.: 16/788,606

(22) Filed: Feb. 12, 2020

(65) Prior Publication Data
US 2020/0272374 A1 Aug. 27, 2020

(30) Foreign Application Priority Data
Feb. 21, 2019 (JP) .............................. JP2019-029308

(51) Int. Cl.
*H04N 1/60* (2006.01)
*G06F 3/12* (2006.01)
*G06T 5/00* (2006.01)

(52) U.S. Cl.
CPC .......... *G06F 3/1208* (2013.01); *G06F 3/1256* (2013.01); *G06T 5/009* (2013.01); *H04N 1/6005* (2013.01); *G06T 2207/20208* (2013.01)

(58) Field of Classification Search
CPC ... H04N 1/6005; G06F 3/1208; G06F 3/1256; G06T 5/009; G06T 2207/20208
USPC .................................. 358/1.9, 1.15, 504, 520
See application file for complete search history.

(56) References Cited

U.S. PATENT DOCUMENTS

| | | | |
|---|---|---|---|
| 5,754,682 A * | 5/1998 | Katoh ..................... | G06T 5/009 348/227.1 |
| 6,954,213 B1 * | 10/2005 | Hidaka .................. | G06T 11/001 345/589 |
| 7,944,588 B2 | 5/2011 | Yamada et al. | |
| 8,237,991 B2 | 8/2012 | Ono et al. | |
| 10,582,087 B2 | 3/2020 | Ogawa et al. | |
| 2015/0358646 A1 * | 12/2015 | Mertens ................... | H04N 9/68 382/166 |

(Continued)

FOREIGN PATENT DOCUMENTS

JP 2006-129105 A 5/2006

*Primary Examiner* — Jamares Q Washington
(74) *Attorney, Agent, or Firm* — Venable LLP

(57) ABSTRACT

An image processing apparatus for displaying on a display device an image corresponding to a printed product observed in a predetermined observation environment. The apparatus includes one or more memories storing instructions, and one or more processors executing the instructions to obtain image data, to obtain a lighting luminance in the predetermined observation environment, to set a maximum luminance to be displayed in the display device according to the obtained lighting luminance, to convert the obtained image data according to the obtained lighting luminance, and to output the converted image data to the display device whose maximum luminance to be displayed has been set according to the obtained lighting luminance.

30 Claims, 11 Drawing Sheets

(56) References Cited

U.S. PATENT DOCUMENTS

2020/0007717 A1 1/2020 Suwa et al.
2020/0007734 A1 1/2020 Kagawa et al.
2020/0013150 A1 1/2020 Kagawa et al.

* cited by examiner

| LUMINANCE[cd/m$^2$] | PQ VALUE |
|---|---|
| 80 | 0.486 |
| 100 | 0.508 |
| 120 | 0.526 |
| 320 | 0.629 |
| 400 | 0.653 |
| 480 | 0.672 |

FIG.7

IMAGE PROCESSING APPARATUS, IMAGE PROCESSING METHOD, CONTROL APPARATUS, CONTROL METHOD, AND STORAGE MEDIUM THAT DISPLAY CONVERTED IMAGE DATA WHOSE MAXIMUM LUMINANCE HAS BEEN SET ACCORDING TO AN OBTAINED LIGHTING LUMINANCE

This application claims the benefit of Japanese Patent Application No. 2019-029308, filed Feb. 21, 2019, which is hereby incorporated by reference herein in its entirety.

BACKGROUND OF THE INVENTION

Field of the Invention

The present invention relates to a technique for displaying an image corresponding to a printed product observed in a predetermined observation environment.

Description of the Related Art

In a color management system (CMS) using an International Color Consortium (ICC) profile, there is achieved a technique for soft-proofing a printed product presented in normal lighting (standard light source D50) on a monitor. The soft-proofing indicates checking of a printing result on the monitor without printing an actual printed product. The standard light source D50 corresponds to a luminance of 100 $cd/m^2$.

Recently, a high-dynamic-range (HDR) image having a reproduction range with a high luminance and a wide color gamut has become widespread. The HDR image has a highest luminance of 1000 nit ($cd/m^2$) or greater and represents a color gamut of BT. 2020. In printing the HDR image by using an inkjet printing apparatus, it is needed to perform D-range compression by using a tone curve, or the like, on a dynamic range (hereafter referred to as a D range) of luminance that can be reproduced by the printing apparatus.

Japanese Patent Laid-Open No. 2006-129105 discloses a technique for correcting contrast reduction in performing the D-range compression. Further, in performing the D-range compression, if compression is performed not only into a normal lighting luminance (100 $cd/m^2$), but also, into a luminance higher than the normal lighting luminance (e.g., 400 $cd/m^2$), it is possible to create a printed product suitable for exhibition in high-luminance lighting. In a case when the printed product created for exhibition in high-luminance lighting is observed in normal lighting, the printed product may look dark. However, in a case when the printed product is observed in high-luminance lighting, a printing effect of a high luminance can be confirmed.

In a case when an image corresponding to the printed product created for exhibition in high-luminance lighting is displayed on a monitor having the same luminance as that used in normal lighting, due to lack of luminance, it is impossible to confirm a printing effect in an exhibition environment. Furthermore, in using ICC profiles, since color conversion processing in consideration of a change in luminance is not performed, appropriate conversion may not be performed in soft-proofing on the monitor.

SUMMARY OF THE INVENTION

According to one aspect, the present invention provides an image processing apparatus for displaying on a display device an image corresponding to a printed product observed in a predetermined observation environment, the apparatus including a first obtaining unit configured to obtain image data, a second obtaining unit configured to obtain a lighting luminance in the predetermined observation environment, a changing unit configured to change a luminance of the display device according to a lighting luminance obtained by the second obtaining unit, a converting unit configured to convert image data obtained by the first obtaining unit according to a lighting luminance obtained by the second obtaining unit, and an outputting unit configured to output image data converted by the converting unit to the display device having the luminance thereof changed by the changing unit.

Further features of the present invention will become apparent from the following description of exemplary embodiments with reference to the attached drawings.

BRIEF DESCRIPTION OF THE DRAWINGS

FIG. 7 is a table showing correspondences between a luminance and a PQ value.

DESCRIPTION OF THE EMBODIMENTS

Figure 1:
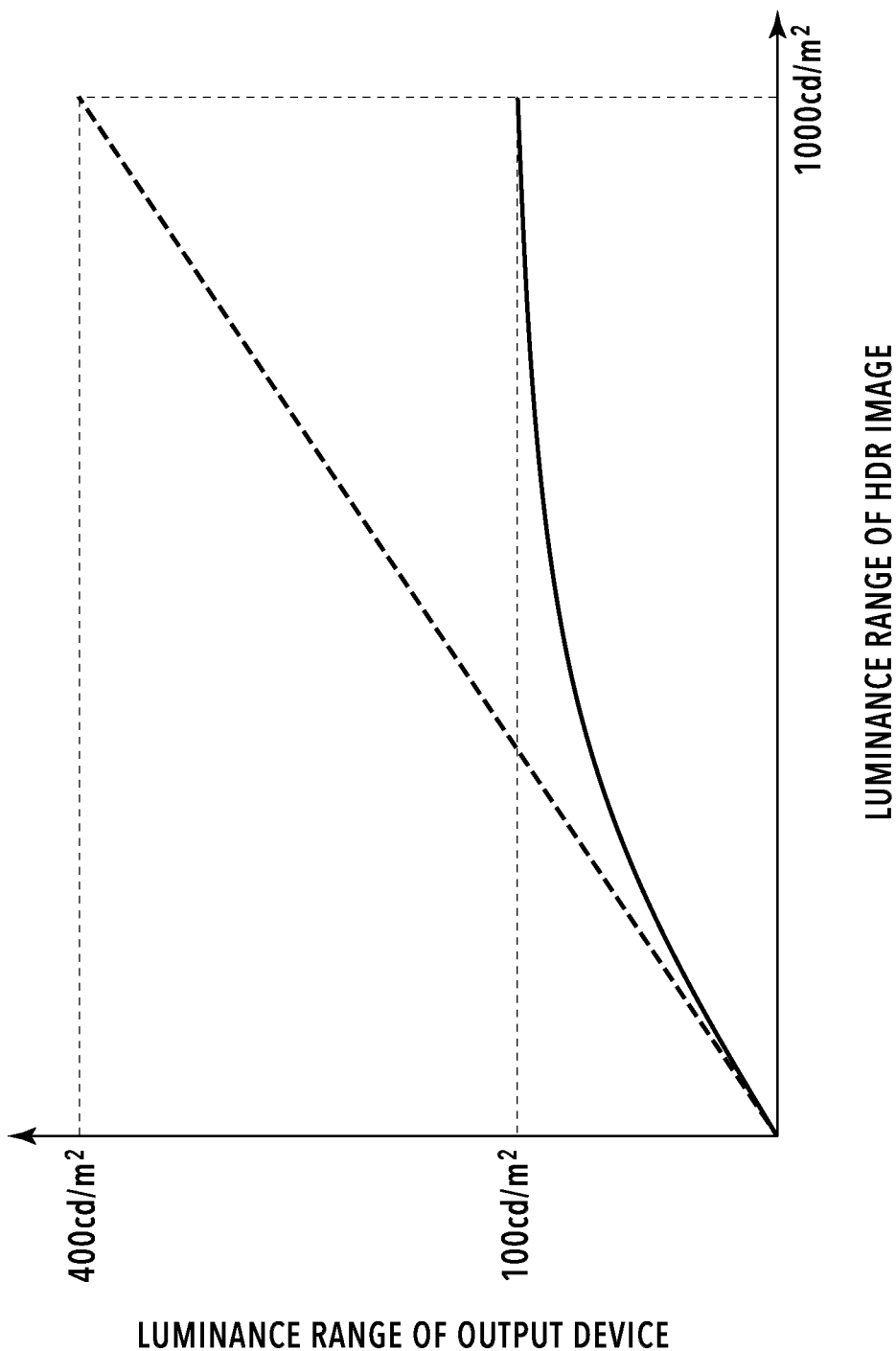
FIG. 1 is a graph showing an example of compression of a luminance range.

Embodiments of the present invention will be described with reference to the drawings. It should be noted that the following embodiments will not limit the present invention, and all of the combinations of the features described in the present embodiments will not be always essential for solution of the present invention. Incidentally, the same component is denoted by the same reference numeral in the following description.

First, prior to the description of the embodiments, supplemental matters of the related art will be described. In using ICC profiles, color conversion processing in consideration of a change in luminance is not performed. In the use of ICC profiles, the color conversion processing is performed on the following assumption. A maximum luminance of an input image is about 100 $cd/m^2$. A display maximum luminance used by a monitor is about 100 $cd/m^2$. An environment in which a printed product is observed also has a maximum luminance of about 100 $cd/m^2$ in normal lighting. By adjusting the luminances, consistency is achieved across the CMSs. Since the luminances match across the CMSs, it is possible to check on the monitor a printing result having a visual effect equivalent to an actual printed product even without creating (printing) the actual printed product, in the use of ICC profiles.

However, in soft-proofing using ICC profiles, the change in luminance is not considered, and, in addition, a monitor luminance is not assumed to be changed at the time of operating an application. Therefore, a monitor luminance (maximum luminance) is normally fixed at about 100 cd/m$^2$.

FIG. 1 is a graph showing an example of compression of a luminance range of an HDR image into a luminance range of an output device (a printer or a monitor). In FIG. 1, a horizontal axis indicates a luminance of an input image on which dynamic-range compression (D-range compression) is performed and a vertical axis indicates a luminance after compression. A D range of an HDR image having a highest luminance of 1000 cd/m$^2$ is compressed, as indicated by a solid line, into about 100 cd/m$^2$ used by a monitor of an output device by reducing a contrast of an area having a high luminance. Meanwhile, in a case when a printed product is exhibited in high-luminance lighting (e.g., 400 cd/m$^2$), for example, a D range of an HDR image is compressed into a D range suitable for observation in high-luminance lighting. However, in the soft-proofing using ICC profiles, a monitor luminance remains fixed at about 100 cd/m$^2$, and the luminances do not match across the CMSs. Therefore, it is impossible to soft proof the printed product assumed to be exhibited in high-luminance lighting.

In the following embodiment, an aspect of allowing soft-proofing (previewing) of a state when a printed product created for exhibition in high-luminance lighting is observed in high-luminance lighting by using a monitor normally used in about 100 cd/m$^2$.

First Embodiment

<Exhibition Environment of Printed Product>

Figure 2:
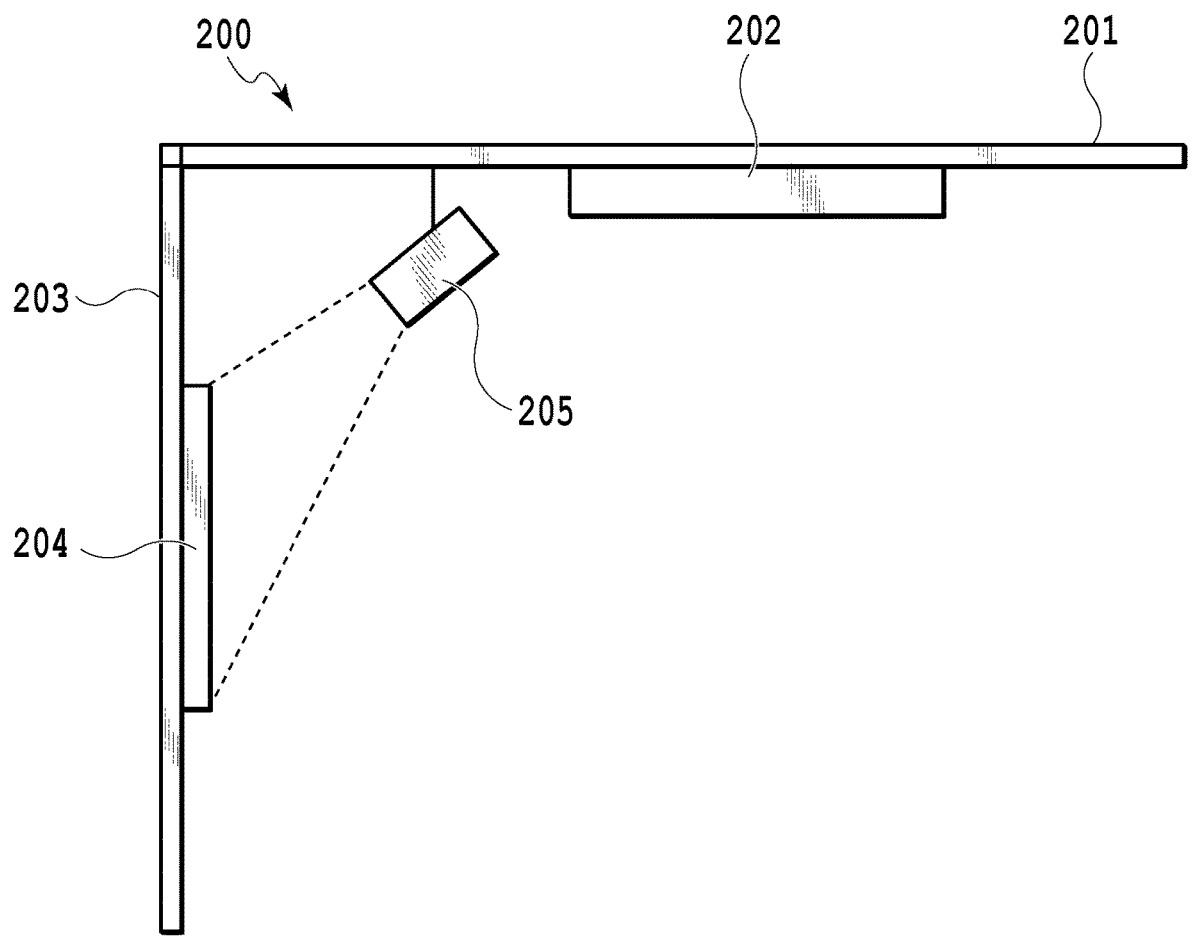
FIG. 2 is a diagram illustrating an exhibition environment of a printed product.

FIG. 2 is a diagram illustrating an exhibition environment of a printed product assumed in the present embodiment. FIG. 2 is a schematic diagram of a room 200 as viewed from a cross section. A room light 202 is arranged on a ceiling 201. A printed product 204 outputted from an inkjet printer is set on a wall 203. An auxiliary light 205 illuminating the printed product 204 is attached on the ceiling 201. A broken line of FIG. 2 illustrates a situation in which the printed product 204 is illuminated by light from the auxiliary light 205. For the auxiliary light 205, a light capable of emitting light having a high luminance for exhibition, or the like, is assumed. By causing the printed product 204 to be illuminated by the auxiliary light 205, an observer can observe the printed product (exhibit) having a luminance higher than a normal luminance of about 100 cd/m$^2$.

<System Configuration>

Figure 3:
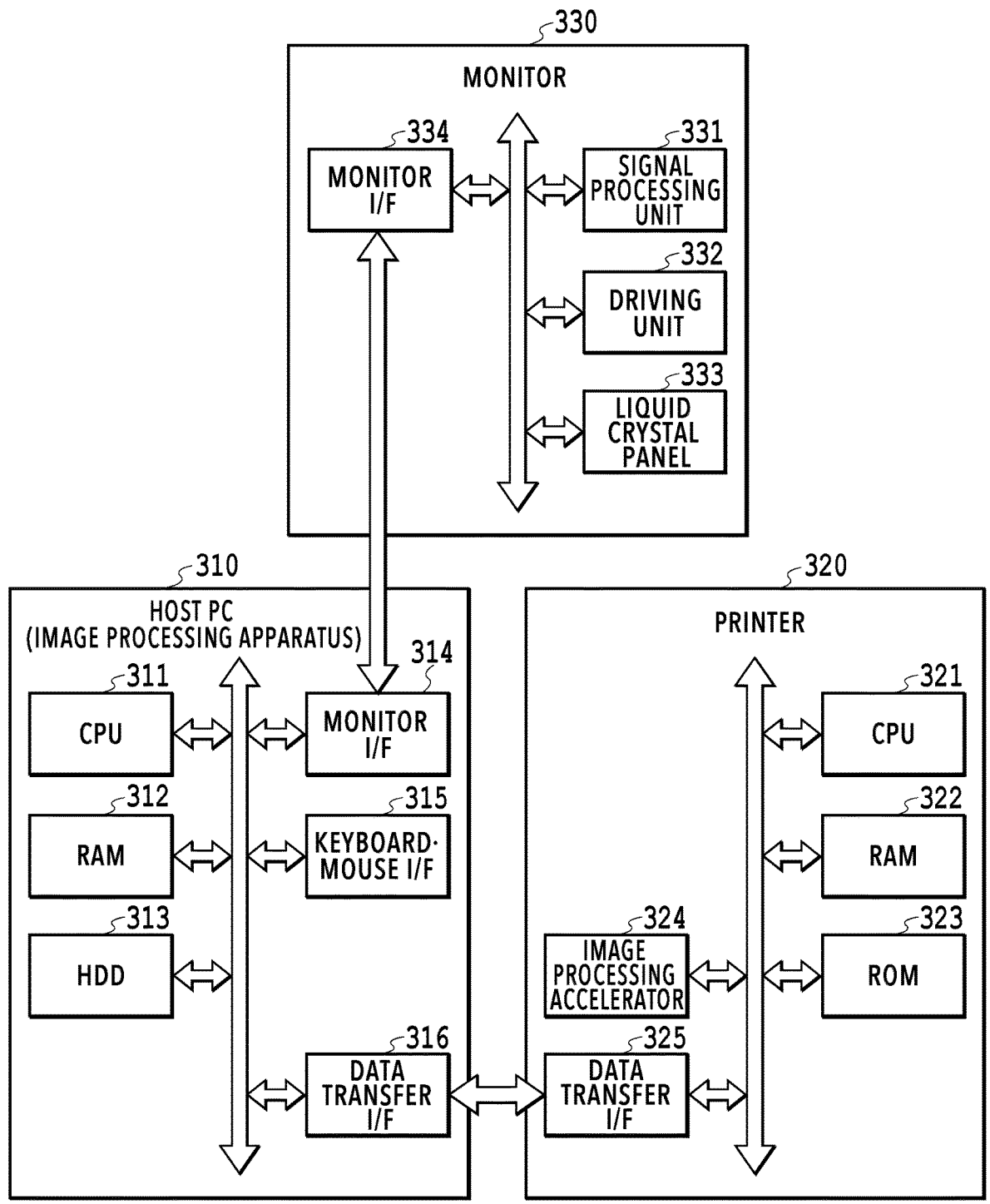
FIG. 3 is a block diagram for explaining a system configuration including an image processing apparatus.

FIG. 3 is a block diagram for explaining a system configuration including an image processing apparatus 310 of the present embodiment. A system of the present embodiment has the image processing apparatus 310, a printer 320, and a monitor 330.

The image processing apparatus 310 is composed of a host PC, and the like. The image processing apparatus 310 has a CPU 311, a RAM 312, a HDD 313, a monitor I/F 314, a keyboard mouse I/F 315, and a data transfer I/F 316. The CPU 311 executes various kinds of processing according to a program stored in the HDD 313 while using the RAM 312 as a work area. For example, the CPU 311 generates image data used for printing by the printer 320 according to a command received from a user via the keyboard mouse I/F 315 and a program stored in the HDD 313. Then, the generated image data is transferred to the printer 320 via the data transfer I/F 316. The CPU 311 can also perform predetermined processing on the image data received from the printer 320 via the data transfer I/F 316 according to a program stored in the HDD. The monitor I/F 314 outputs various kinds of information to the monitor 330 according to a command received from a user via the keyboard mouse I/F 315 and a program stored in the HDD 313. In the present embodiment, an image is displayed on the monitor 330 by using image data used for printing by the printer 320.

The printer 320 has a CPU 321, a RAM 322, a ROM 323, an image processing accelerator 324, and a data transfer I/F 325. The CPU 321 performs various kinds of processing according to a program stored in the ROM 323 while using the RAM 322 as a work area. The image processing accelerator 324 is hardware capable of performing image processing at a higher speed as compared to the CPU 321. The image processing accelerator 324 is activated by the CPU 321 writing into a predetermined address of the RAM 322 a parameter and data required for the image processing, and, after loading the parameter and data, performs predetermined image processing. It should be noted that instead of the image processing accelerator 324, the same processing may be performed by the CPU 321.

The monitor 330 has a signal processing unit 331, a driving unit 332, a liquid crystal panel 333, and a monitor I/F 334. The signal processing unit 331 performs predetermined processing based on image data (image signal) and control data inputted from the monitor I/F 334. The driving unit 332 drives the liquid crystal panel 333 based on a signal processed by the signal processing unit 331. For the monitor 330 of the present embodiment, a typical monitor display can be used. The signal processing unit 331 can adjust a luminance used for display of the liquid crystal panel 333. A maximum luminance of the monitor 330 of the present embodiment is set at 400 cd/m$^2$. It should be noted that, in a typical use mode, a maximum luminance that the monitor 330 normally uses is set at about 100 cd/m$^2$.

<Block Diagram of Image Processing Apparatus>

Figure 4:
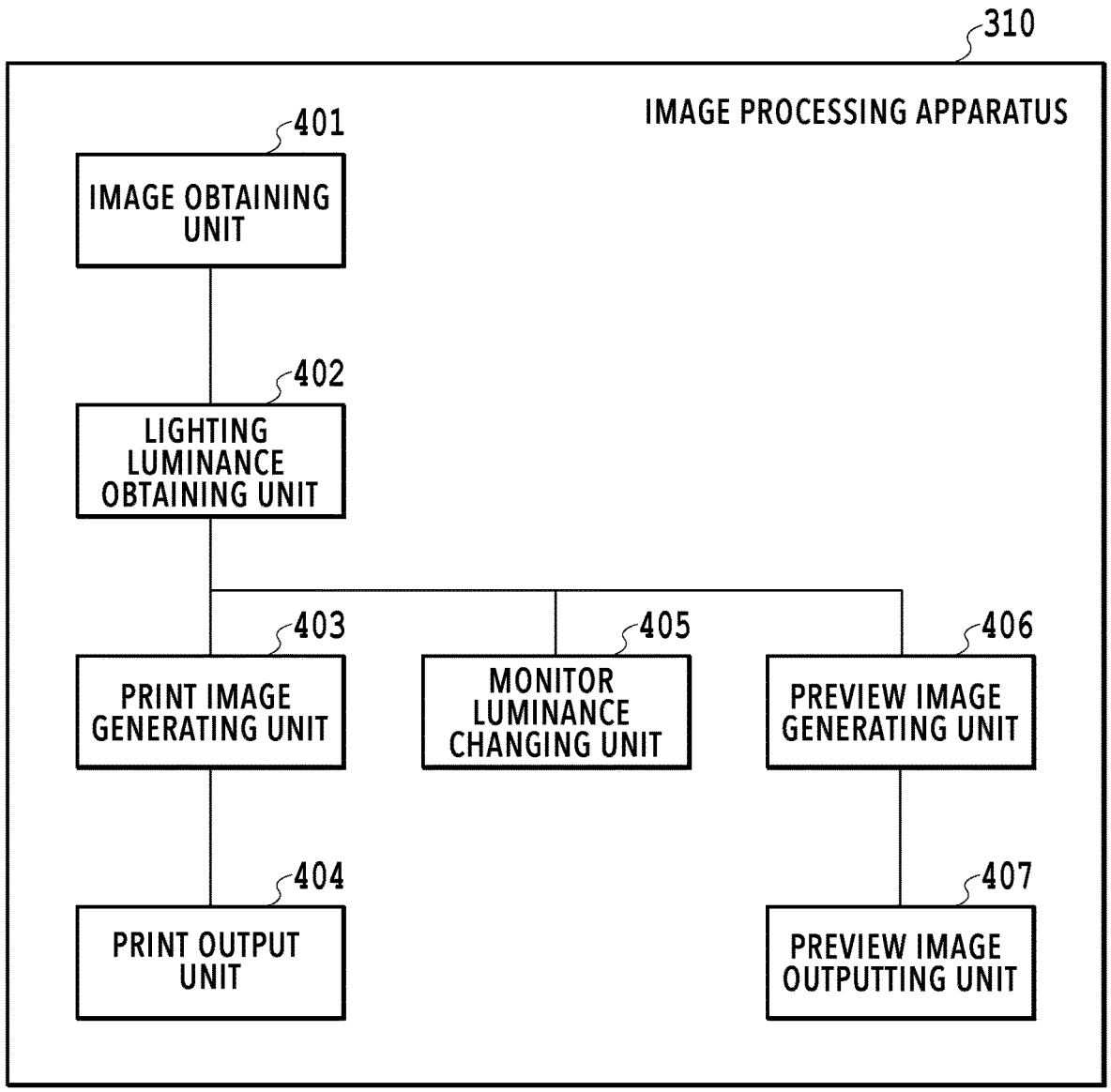
FIG. 4 is a diagram showing an example of a functional block of an image processing apparatus.

FIG. 4 is a diagram showing an example of a functional block of the image processing apparatus 310 of the present embodiment. The image processing apparatus 310 has an image obtaining unit 401, a lighting luminance obtaining unit 402, a print image generating unit 403, a print output unit 404, a monitor luminance changing unit 405, a preview image generating unit 406, and a preview image outputting unit 407. As for the components shown in FIG. 4, the CPU 311 of the image processing apparatus 310 loads the program stored in the HDD 313 into the RAM 312 and executes it, so that the CPU 311 functions as the components shown in FIG. 4.

The image processing apparatus 310 of the present embodiment serves as not only an apparatus that generates image data for generating a printed product to be exhibited in high-luminance lighting, but also, an apparatus that generates image data for previewing an image corresponding to the printed product in a case when the printed product is observed in high-luminance lighting. In the present embodiment, processing based on an HDR image will be described.

The image obtaining unit 401 obtains image data to be used for processing. The image obtaining unit 401 may obtain image data stored in the HDD 313 or may obtain image data inputted from an external device, or the like. In the present embodiment, the image obtaining unit 401 obtains image data on the HDR image. The HDR image will be described. In a case of an image in a typical format such as JPEG or TIFF, the image has a maximum luminance of 100 cd/m². Meanwhile, in a case of the HDR image, the image has a maximum luminance of 1000 cd/m² or greater, and is represented by data with high-luminance image information. In the present embodiment, a maximum luminance of the HDR image obtained by the image obtaining unit 401 is set at 1000 cd/m².

The lighting luminance obtaining unit 402 obtains an observation condition of an environment in which a printed product is exhibited. For example, the lighting luminance obtaining unit 402 may obtain a lighting luminance directly inputted by a user to the image processing apparatus 310 or may convert an illuminance inputted by a user into a luminance and obtain a converted luminance. Alternatively, a luminance in an exhibition environment may be measured by using a measuring device (not shown) and the measured luminance may be inputted to the image processing apparatus 310. Further, instead of causing a user to input a value of luminance, a user may be allowed to select lighting from options such as normal lighting, medium-luminance lighting, and high-luminance lighting, and then, a luminance corresponding to the selection may be obtained. As shown in FIG. 2, in an environment illuminated by a plurality of lights, a lighting luminance in consideration of the plurality of lights may be obtained. Further, a lighting luminance in consideration of a distance at which a user observes a printed product may be obtained. In the present embodiment, a lighting luminance set by a user, that is, a lighting luminance obtained by the lighting luminance obtaining unit 402, is 400 cd/m². The following processing will be separated into processing for printing and processing for preview display. First, the processing for printing will be described.

The print image generating unit 403 generates image data for printing so that an image obtained by the image obtaining unit 401 is printed as a printed product suitable for observation in an environment with a lighting luminance obtained by the lighting luminance obtaining unit 402. Since the obtained HDR image data has a maximum luminance of 1000 cd/m², the print image generating unit 403 performs D-range compression in accordance with a lighting luminance of 400 cd/m² as obtained. For example, the print image generating unit 403 may perform D-range compression on a luminance of the obtained HDR image into a predetermined luminance range by using a 1-D lookup table (hereafter referred to as a 1DLUT), or the like.

Figure 5:
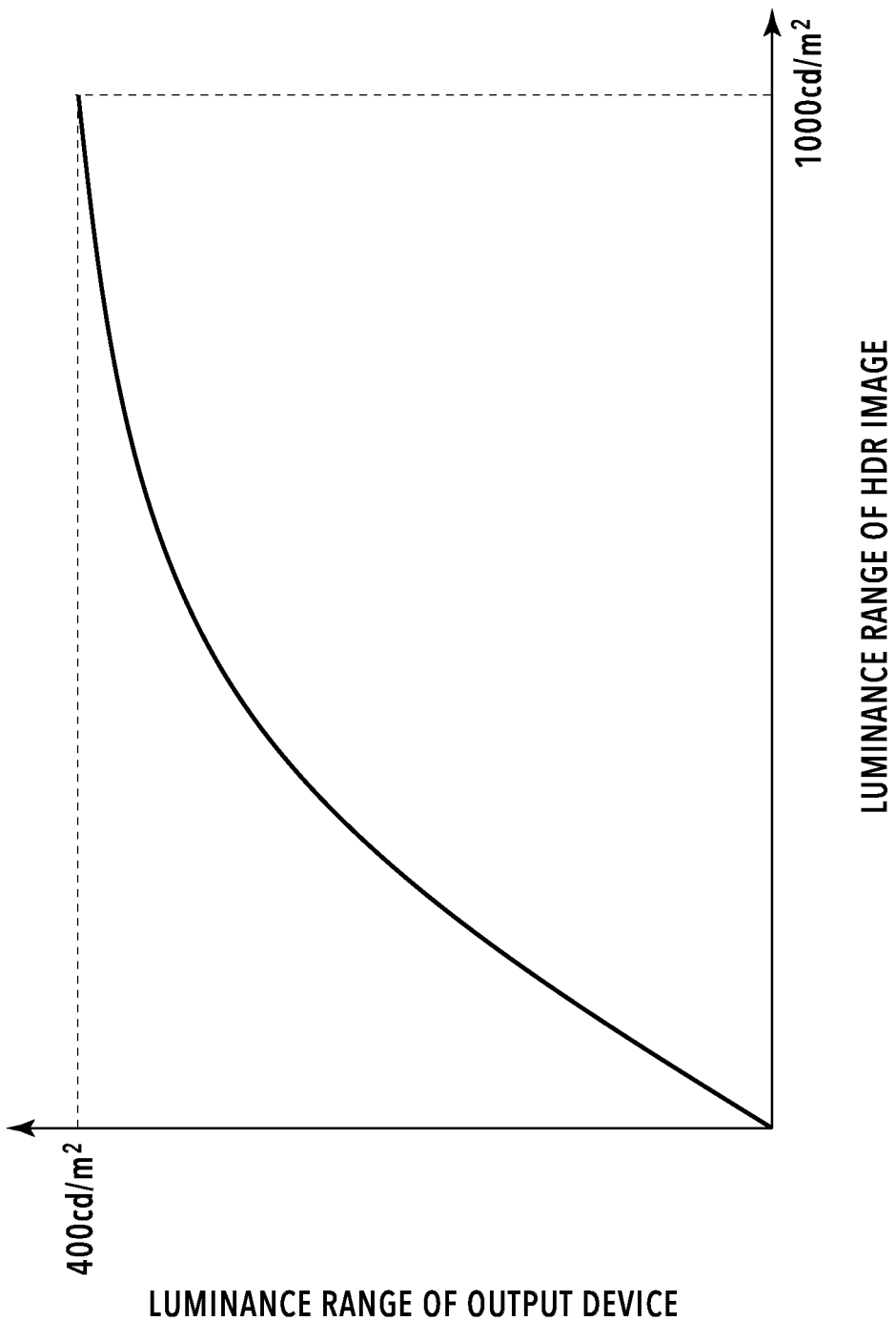
FIG. 5 is a graph illustrating dynamic-range compression.

FIG. 5 is a graph illustrating D-range compression performed in the present embodiment. In FIG. 5, a horizontal axis indicates a luminance of an input on which D-range compression is performed and a vertical axis indicates a luminance after compression. The HDR image data having a luminance range of 1000 cd/m² is compressed into a luminance range of 400 cd/m² that can be handled by the printer 320 according to the compression properties shown in FIG. 5. It should be noted that in performing D-range compression, a luminance of a dark part is maintained herein because compressing the dark part as well results in a change in atmosphere of the entire image. That is, compression is performed such that a compression rate of a light part (particularly, the lightest part) is greater than a compression rate of the dark part. If a contrast has a higher priority, the D-range compression may be performed together with the dark part. It should be noted that, although the aspect of performing D-range compression by using the 1DLUT has been described in this example, any method can be used for the D-range compression. Since the print image generating unit 403 generates image data for printing, processing such as gamut compression specific to print data generation, or the like, may be performed.

The print output unit 404 outputs the image data for printing generated by the print image generating unit 403 to the printer 320. In the printer 320, printing processing using the image data outputted from the print output unit 404 is performed. The thus-obtained printed product is exhibited in an environment with a lighting luminance as shown in FIG. 2, and an observer can observe the printed product in a luminance range of 400 cd/m².

Next, the processing for preview display will be described. The monitor luminance changing unit 405 changes a luminance of the monitor 330 to a luminance corresponding to the lighting luminance obtained by the lighting luminance obtaining unit 402. For example, the monitor luminance changing unit 405 sets the monitor luminance to a luminance at the same brightness level as a white part of the printed product as viewed in lighting having the obtained lighting luminance. The monitor luminance changing unit 405 outputs a luminance change signal to the monitor 330 via the monitor I/F 314. In the present embodiment, the monitor luminance changing unit 405 outputs a signal indicating an instruction to change the monitor luminance to 400 cd/m² to the monitor 330. In response to the instruction, the monitor 330 sets the maximum luminance to 400 cd/m².

The preview image generating unit 406 generates an image for previewing. The preview image generating unit 406 performs D-range compression in the same manner as the print image generating unit 403. That is, the preview image generating unit 406 performs D-range compression on the HDR image data having a maximum luminance of 1000 cd/m² into image data having a maximum luminance corresponding to a lighting luminance of 400 cd/m² in an observation environment. It should be noted that the D-range compression may be performed in the same manner as the image processing described in the description of the print image generating unit 403. Since the preview image generating unit 406 generates image data for previewing on the monitor, image processing specific to monitor display may be performed.

The preview image outputting unit 407 outputs the preview image generated by the preview image generating unit 406 to the monitor 330. The monitor 330 displays the preview image outputted from the preview image outputting unit 407 in a state when the luminance has been changed by the monitor luminance changing unit 405.

According to the above processing, it gives the impression that a visual appearance of the printed product printed by the print output unit 404 as exhibited in an exhibition environment with a lighting luminance of 400 cd/m² is similar to a visual appearance of the preview image being displayed on the monitor 330 by the preview image outputting unit 407. That is, the preview image outputting unit 407 displays the preview image on the monitor 330 having the luminance thereof changed by the monitor luminance changing unit 405, so that the image of the printed product as observed in the actual exhibition environment can be checked. In other words, also in a luminance condition that is different from the normal luminance condition (about 100 cd/m²), it is possible to achieve soft-proofing.

It should be noted that in the configuration of FIG. 4, for the purpose of explaining the soft-proofing, the configuration in which both of the print image and the preview image are generated has been described, but the processing of generating a print image may be performed after the user checks the preview image. That is, before the print output unit 404 sends a print instruction to the printer 320, the image processing apparatus 310 causes the preview image outputting unit 407 to display a preview image on the monitor 330 and waits for checking of the image by the user. Then, only in a case when a print instruction is inputted by the user, the print output unit 404 may output the print instruction to the printer 320.

Furthermore, the system configuration described with reference to FIG. 3 is an outline, and the image processing apparatus 310, the printer 320, and the monitor 330 may be connected to each other over a network. For example, the image processing apparatus 310 and the monitor 330 may be arranged on a first location, and the printer 320 may be arranged on a second location different from the first location. Then, after the monitor 330 performs soft-proofing, the printer 320 may perform printing in the second location near the actual exhibition area arranged in a remote site.

Figure 6A:
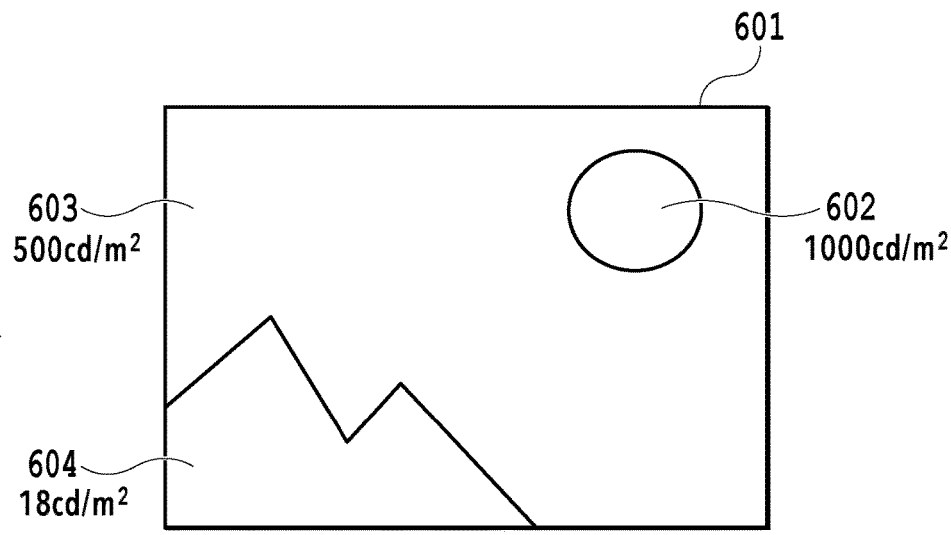
FIG. 6A to FIG. 6C are diagrams illustrating an effect produced by the dynamic-range compression.
Figure 6B:
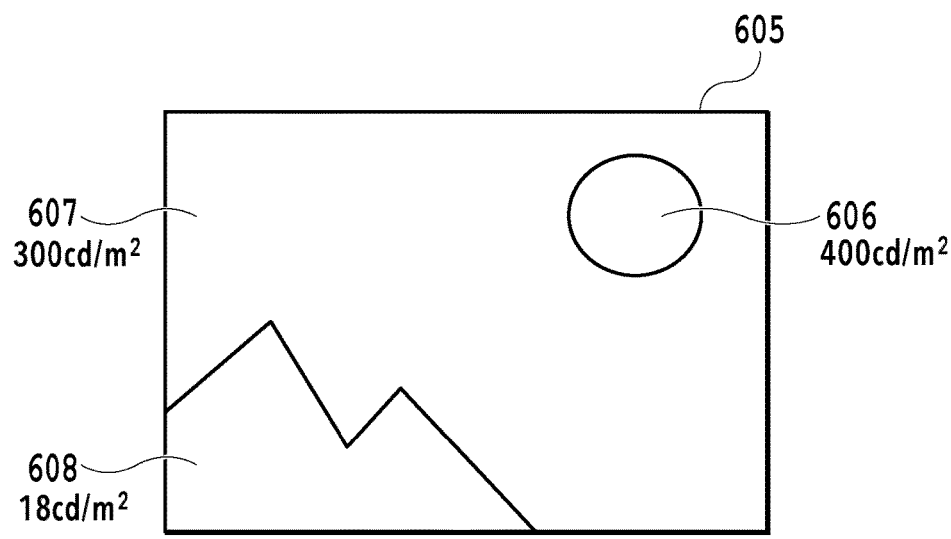
Figure 6C:
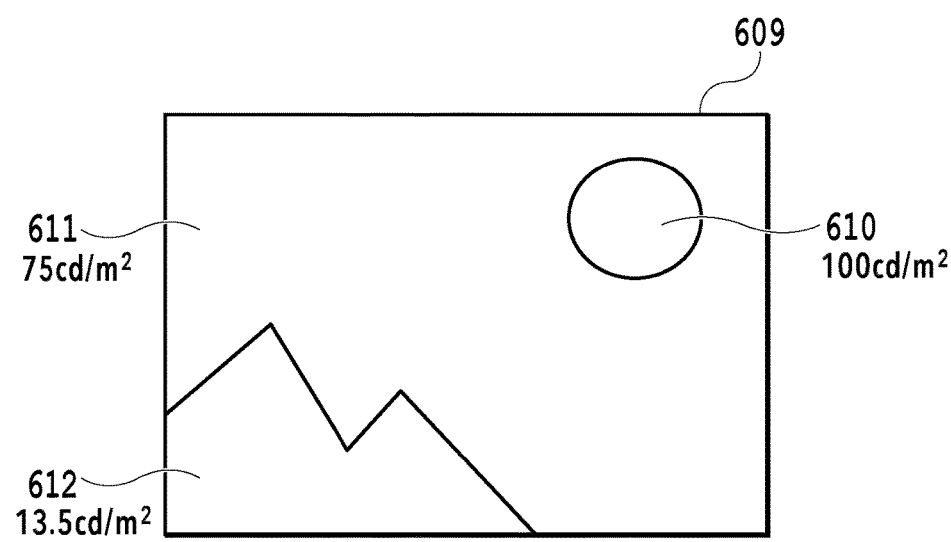

FIG. 6A to FIG. 6C are diagrams illustrating an effect produced by the D-range compression. An image 601 of FIG. 6A shows an image (input image) obtained by the image obtaining unit 401. The image 601 is an HDR image. An area 602 represents the sun and is the lightest part of the image 601 with a luminance of 1000 cd/m$^2$. An area 603 represents the sky and has a luminance of 500 cd/m$^2$. An area 604 represents a mountain in the shade and has a luminance of 18 cd/m$^2$.

FIG. 6B shows an image 605 corresponding to the image 601. The image 605 represents a visual appearance of a printed product obtained by performing D-range compression on the image 601 and printing the result, as viewed in an environment with a lighting luminance of 400 cd/m$^2$. Since the lighting luminance is 400 cd/m$^2$, an area 606, which is the lightest part of the image 605, has a luminance of 400 cd/m$^2$. An area 607 is subjected to D-range compression and the luminance becomes 300 cd/m$^2$. Since an area 608 is subjected to D-range compression with the luminance of the dark part maintained as shown in FIG. 5, the luminance remains 18 cd/m$^2$. As already described, since the image outputted from the preview image outputting unit 407 is displayed on the monitor 330 having the luminance thereof changed, the image can be displayed in the same manner as shown in FIG. 6B. As already described, since the monitor 330 of the present embodiment has a maximum luminance of 400 cd/m$^2$, the area 606 is preview-displayed on the monitor 330 with a luminance of 400 cd/m$^2$ as in the exhibition environment of the printed product. It should be noted that, on the monitor 330, an area representing an image and an area other than the image may be displayed with different luminances. For example, the monitor 330 having the maximum luminance increased to 400 cd/m$^2$ may look dizzy for typical observation. For this reason, as for the UI display of the area other than the area representing the image, in a case when the luminance of the monitor 330 is increased, the monitor 330 may be controlled to display at a lower brightness level. FIG. 6C will be described later in a third embodiment.

It should be noted that, in the above-described example, the luminance of the monitor 330 is changed to the same luminance as the lighting luminance obtained by the lighting luminance obtaining unit 402. However, there may be a case when the luminance of the monitor 330 cannot be set to a luminance that completely matches with the obtained lighting luminance. In the present embodiment, the monitor luminance to be changed does not need to match with the same luminance as the lighting luminance obtained by the lighting luminance obtaining unit 402. This is because, as long as a difference between the monitor luminance to be changed and the lighting luminance obtained by the lighting luminance obtaining unit 402 is within a predetermined range, substantially the same visual effect can be obtained. This will be described below.

In the currently used soft-proofing, a monitor luminance within the range from 80 cd/m$^2$ to 120 cd/m$^2$ is used with respect to a maximum luminance of 100 cd/m$^2$ of an input image. This range can be assumed to be a luminance range that generally allows the humans to perceive the same visual effect. As a unit of brightness in consideration of the characteristics of human vision, a perceptual quantization (PQ) curve is widely used.

FIG. 7 is a table showing correspondences between a luminance and a PQ value. As shown in FIG. 7, a luminance of 80 cd/m$^2$ corresponds to a PQ value of 0.486. Similarly, a luminance of 100 cd/m$^2$ corresponds to a PQ value of 0.508, and a luminance of 120 cd/m$^2$ corresponds to a PQ value of 0.526. Therefore, it is assumed that a luminance corresponding to a PQ value by a margin of about plus or minus 0.02 is practical for soft-proofing.

Meanwhile, as for a luminance of about 400 cd/m$^2$, as shown in FIG. 7, a luminance of 320 cd/m$^2$ corresponds to a PQ value of 0.629, a luminance of 400 cd/m$^2$ to a PQ value of 0.653, and a luminance of 480 cd/m$^2$ to a PQ value of 0.672. Assuming that a luminance corresponding to a PQ value by a margin of about plus or minus 0.02 is practical for soft-proofing, in a case of a lighting luminance of 400 cd/m$^2$, the monitor luminance is set within the range from 320 cd/m$^2$ to 480 cd/m$^2$, so as to allow the humans to perceive the same visual effect. That is, in a case when the lighting luminance obtained by the lighting luminance obtaining unit 402 is 400 cd/m$^2$, the monitor luminance can be set within the range from 320 cd/m$^2$ to 480 cd/m$^2$, and within this range, the same effect of soft-proofing can be obtained.

<Flowchart>

Figure 8:
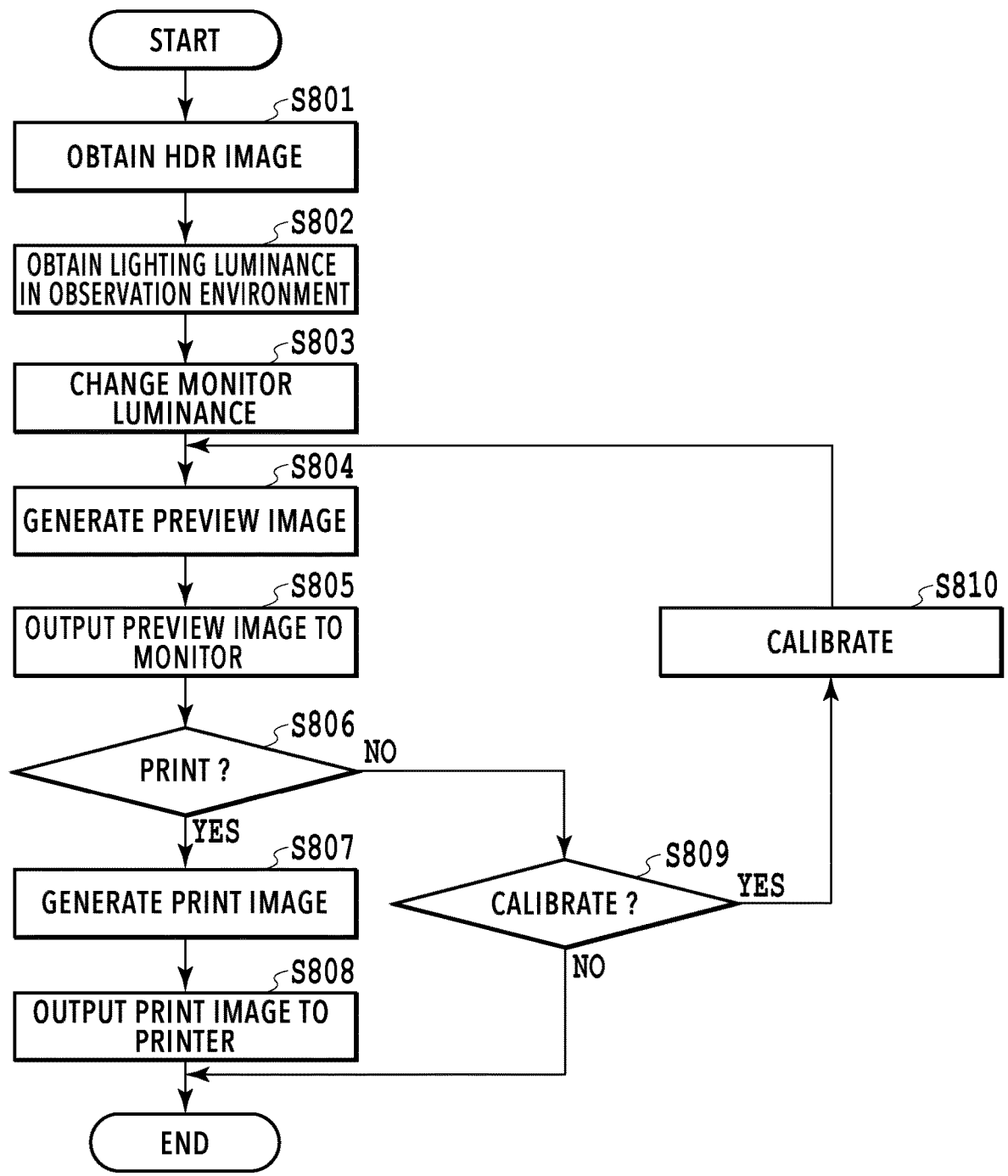
FIG. 8 is an exemplary flowchart of an image processing apparatus.

FIG. 8 is an exemplary flowchart of the image processing apparatus 310 of the present embodiment. A series of processing shown in the flowchart of FIG. 8 is performed by the CPU 311 loading a program code stored in the HDD 313 into the RAM 312 and executing it. Alternatively, part of the steps in FIG. 8 or all of the functions may be achieved by hardware such as an ASIC or an electronic circuit. It should be noted that the sign "S" in the description of each processing means a step in the flowchart.

In S801, the image obtaining unit 401 obtains HDR image data serving as original data on a printed product. In S802, the lighting luminance obtaining unit 402 obtains a lighting luminance in an observation environment in which the printed product is exhibited. S801 and S802 may take place in an opposite order.

In S803, the monitor luminance changing unit 405 changes the luminance of the monitor 330 according to the lighting luminance obtained in S802. In S804, the preview image generating unit 406 performs D-range compression on the HDR image data obtained in S801 to conform to a D range of the lighting luminance obtained in S802. That is, the preview image generating unit 406 performs D-range compression to conform to the D range of the monitor luminance changed in S803, and generates a preview image. In S805, the preview image outputting unit 407 outputs the data on the preview image generated in S804 to the monitor 330. Accordingly, on the monitor 330, the preview image is displayed in the same situation as an exhibition environment in the observation environment.

In S806, the image processing apparatus 310 determines whether a print instruction has been inputted by a user. In a case when a print instruction has been inputted, the process proceeds to S807. Otherwise, the process proceeds to S809. In S807, the print image generating unit 403 performs D-range compression on the HDR image data obtained in S801 to conform to a D range of the lighting luminance obtained in S802, and generates a print image. Then in S808, the print output unit 404 outputs the data on the print image generated in S807 to the printer 320, and the processing is finished. Accordingly, a printed product is created in the printer 320. By exhibiting the created printed product in the actual observation environment, the printed product with the expanded D range is observed.

In a case when a print instruction is not inputted by a user in S806, in S809, the image processing apparatus 310 determines whether a calibration instruction has been inputted by a user. In soft-proofing, the printed product can be checked on the monitor 330, and the image is corrected as needed. In a case when there is no calibration instruction, the processing is finished. In a case when there is a calibration instruction, the process proceeds to S810, and calibration processing is performed. After that, the process proceeds to S804, and the preview image generating unit 406 generates a preview image by using the image data on which the calibration processing has been performed. It should be noted that in S807, in a case when the image data has been calibrated in S810, the print image generating unit 403 performs print processing by using the image data after the calibration.

<Details of D-Range Compression>

Figure 9:
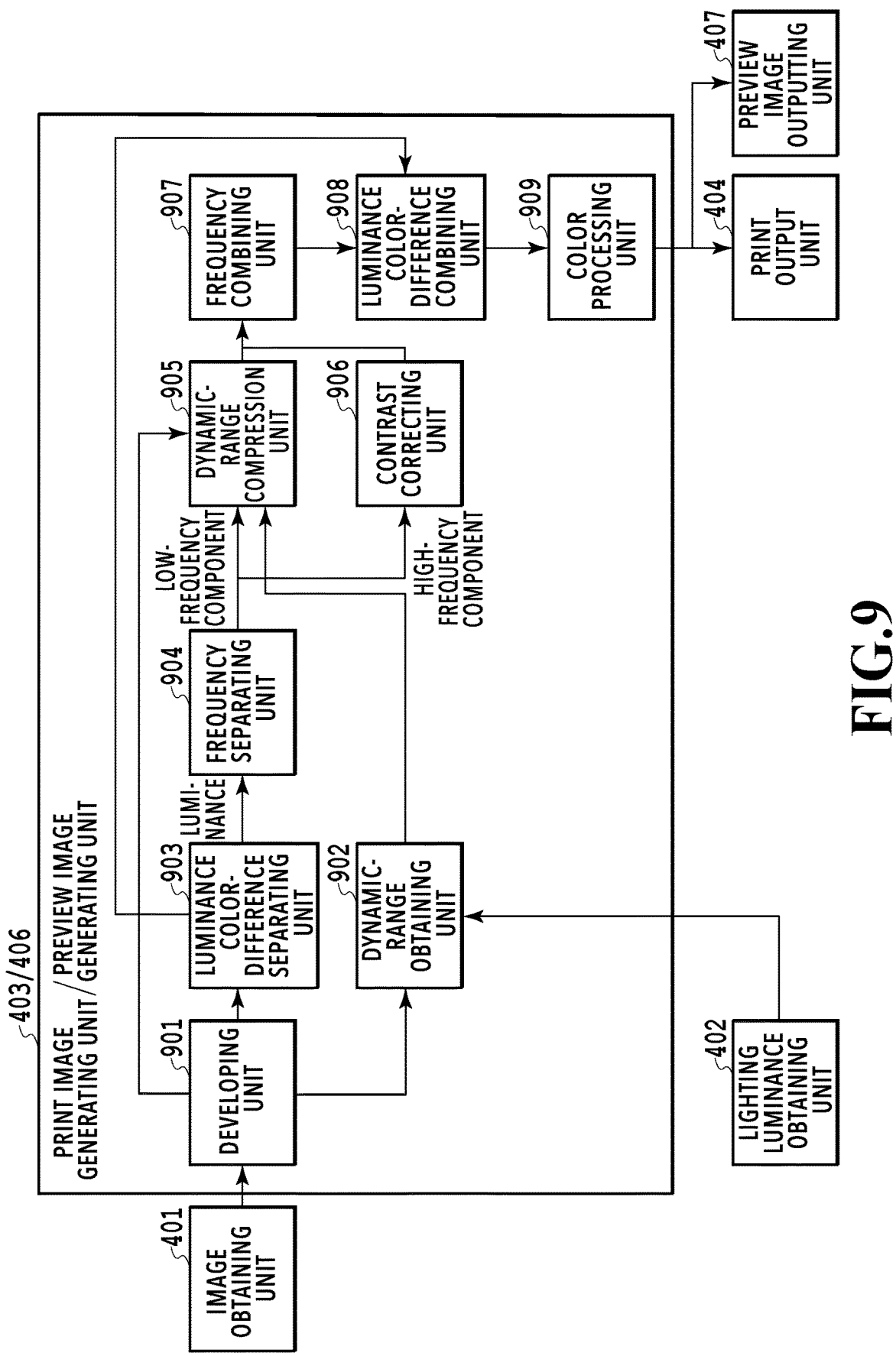
FIG. 9 is a block diagram showing details of a print image generating unit and a preview image generating unit.

FIG. 9 is a block diagram showing details of the print image generating unit 403 and the preview image generating unit 406 which perform D-range compression. A developing unit 901 converts the image data obtained by the image obtaining unit 401 into image data in a predetermined format. In the developing unit 901, a D range of the image obtained by the image obtaining unit 401 is also derived. A value of the obtained D range is sent to a dynamic-range obtaining unit 902. The dynamic-range obtaining unit 902 individually obtains a D range of the image serving as an input obtained by the image obtaining unit 401 and luminance information (D range) serving as an output obtained by the lighting luminance obtaining unit 402 and outputs them to a dynamic-range compression unit 905. It should be noted that, in the present embodiment, since a value of the dark part is fixed at "0" within the D range, a maximum luminance of the light part corresponds to the D range.

A luminance color-difference separating unit 903 separates the developed image into a luminance and a color difference. A frequency separating unit 904 separates spatial frequencies of the image into a low-frequency component and a high-frequency component. In this example, the processing to separate a luminance into a low-frequency component and a high-frequency component is performed. Among the separated frequencies, the low-frequency component is outputted to the dynamic-range compression unit 905. The dynamic-range compression unit 905 performs processing based on the value of the D range obtained by the dynamic-range obtaining unit 902. At this time, the processing is performed by using the data from the developing unit 901.

Meanwhile, the high-frequency component is outputted to a contrast correcting unit 906. The contrast correcting unit 906 performs contrast correction. In this manner, after the processing is performed for each frequency component, a frequency combining unit 907 combines the separated frequency components. The luminance color-difference combining unit 908 combines the luminance combined by the frequency combining unit 907 and the color difference. According to this processing, the D-range compression is performed. It should be noted that a color processing unit 909 performs color conversion processing according to an output device (a printer or a monitor).

It should be noted that, as described above, the processing by the print image generating unit 403 and the processing by the preview image generating unit 406 may be the common processing. In the present embodiment, a description has been given on the aspect of separately providing the print image generating unit 403 and the preview image generating unit 406, but an image generating unit into which the print image generating unit 403 and the preview image generating unit 406 are integrated, may be provided.

Figure 10:
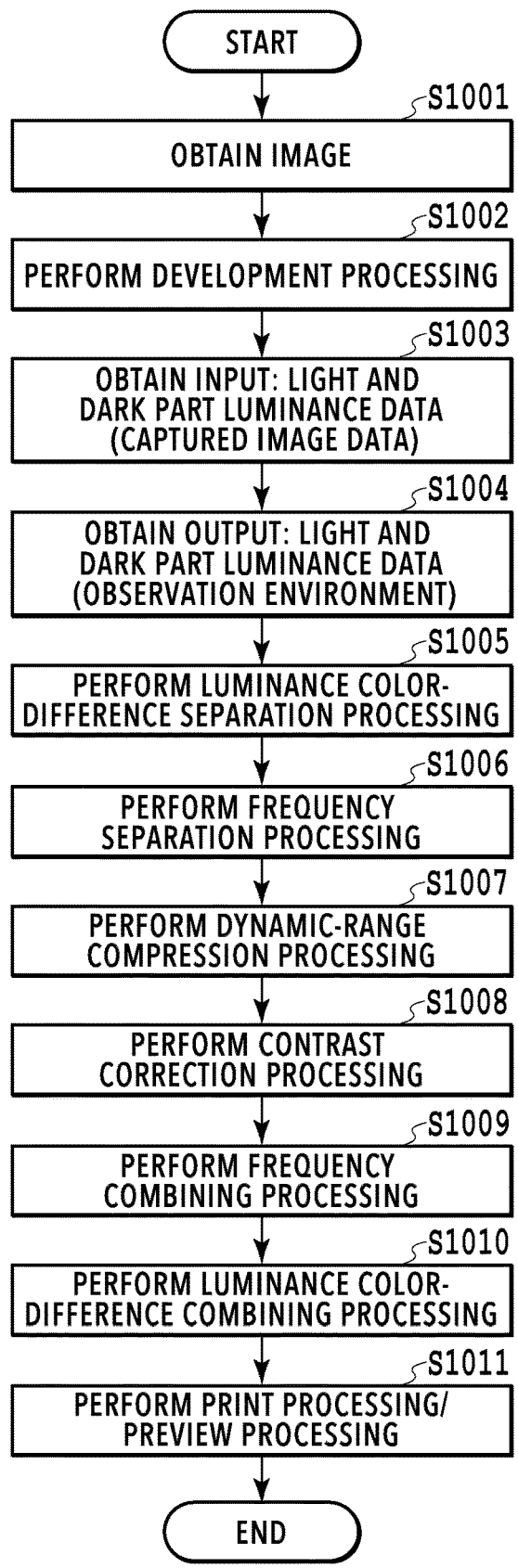
FIG. 10 is a flowchart showing details of a print image generating unit and a preview image generating unit.

FIG. 10 is a flowchart including the processing by the print image generating unit 403 and the processing by the preview image generating unit 406. In S1001, the image obtaining unit 401 obtains captured image data. The image data as obtained herein is not general-purpose data captured by a digital camera and processed in JPEG format, or the like, but so-called RAW data as originally captured. This is because a D range is expanded by image processing. In S1002, the developing unit 901 performs development of the RAW data.

In S1003, the dynamic-range obtaining unit 902 obtains luminance data on light and dark parts of the input. The light part can be obtained from a value derived from camera information and a capture time setting included in the obtained image data, as well as a result of the development processing in S1002. Particularly, for the light part, luminance data is obtained by white balance adjustment. It should be noted that, in performing white balance adjustment, by performing replacement processing according to a saturation level and pixel information, gradation of a high-luminance area not having obtained gradation can be expanded (N steps: N≥1). A value of the dark part is set at zero. It should be noted that, on a piece of paper that cannot represent a black density, the black density of the paper may be inputted as the luminance data on the dark part. Furthermore, in a case when the black color of the input and the black color of the output do not match, LUT conversion may be performed so that they match. In S1004, the dynamic-range obtaining unit 902 obtains luminance data on the light and dark parts in the output side.

In S1005, the luminance color-difference separating unit 903 performs separation into information on luminance (Y) and information on color differences (CbCr) based on RGB signal values. The conversion is carried out according to the following expression:

$$Y=0.299 \times R+0.587 \times G+0.114 \times B$$

$$Cb=-0.16874 \times R-0.33126 \times G+0.5 \times B$$

$$Cr=0.5 \times R-0.41869 \times G-0.081 \times B. \quad \text{Expression (1)}$$

In S1006, the frequency separating unit 904 separates the image converted into the luminance into a low-frequency component image and a high-frequency component image. To generate a low-frequency component, a low pass filter is applied. For a processing method, a spatial filter may be applied, or the image may be temporarily converted into spatial frequencies by the FFT and then recovered by the IFFT after filtering processing. Target frequencies may be determined based on a sheet size and an observation distance in viewing a printed product in consideration of the characteristics of human vision. The high-frequency component may be obtained by the application of an inverse high pass filter or may be obtained by subtracting the obtained low-frequency component from the original image.

In S1007, the dynamic-range compression unit 905 performs D-range compression processing on the low-frequency component based on the information on the light and dark parts of the input obtained in S1003 and the output obtained in S1004. In S1008, the contrast correcting unit 906 performs contrast correction processing on the high-frequency component. The contrast correction processing is, for example, processing to multiply the obtained image by a coefficient k. To obtain an image closer to a scene as captured, the coefficient k may be set close to k=1, and further, in a case when it is preferable to consider degradation due to oozing of ink, or the like, in the printed product, the coefficient k may be set at a value equal to or greater than 1. S1007 and S1008 may take place in an opposite order or at the same time.

In S1009, the frequency combining unit 907 combines the low-frequency component image for which D-range compression has been performed on the low-frequency component and the high-frequency component image for which contrast correction has been performed on the high-frequency component. Accordingly, compression is performed into a predetermined D range, and a luminance image with a corrected contrast can be obtained.

In S1010, the luminance color-difference combining unit 908 combines the color-difference components and performs conversion into RGB according to the following expression:

$$R = Y + 1.402 \times Cr$$

$$G = Y - 0.34414 \times Cr - 0.71414 \times Cr$$

$$B = Y + 1.772 \times Cb. \quad \text{Expression (2)}$$

In S1011, the color processing unit 909 performs image processing for printing or image processing for previewing on the obtained RGB signal values.

As described above, the present embodiment can achieve the aspect in which the printed product created for exhibition in high-luminance lighting looks the same on the monitor 330. Accordingly, it is possible to achieve soft-proofing of the printed product created for exhibition in high-luminance lighting.

Second Embodiment

In the first embodiment, a description has been given on the aspect in which D-range compression is performed on the HDR image so that the D range conforms to a range wider (a luminance higher) than a range typically using ICC profiles, or the like, and the image data corresponding to the high luminance is outputted to the printer and the monitor. In the present embodiment, an aspect of outputting data suitable for a typical printer and a standard-dynamic-range (SDR) monitor will be described.

Figure 11:
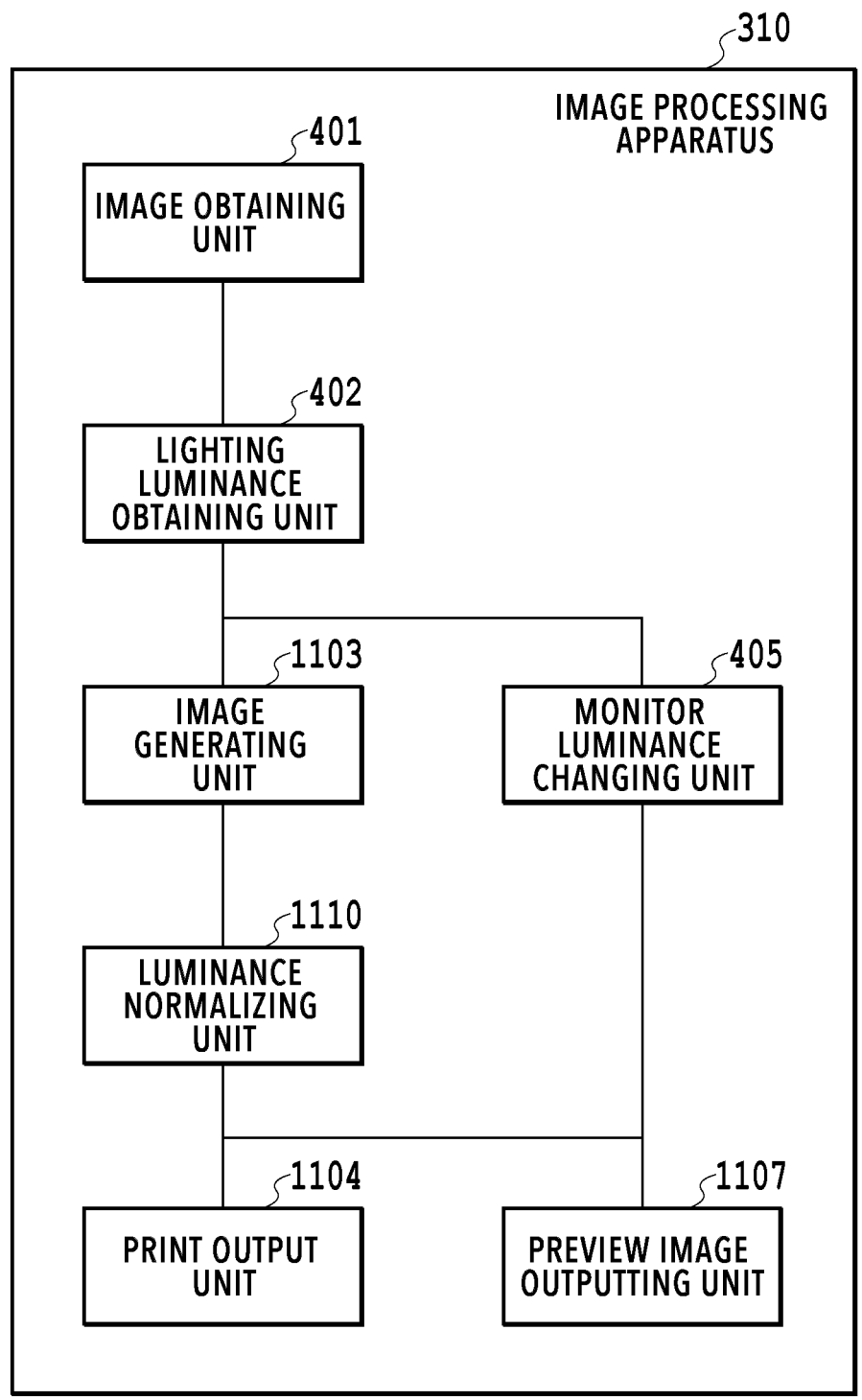
FIG. 11 is a block diagram of an image processing apparatus.

FIG. 11 is a block diagram of an image processing apparatus 310 of the present embodiment. The same component as the one shown in FIG. 4 will be denoted by the same reference numeral, and the description thereof will be omitted. In the present embodiment, instead of the print image generating unit 403 and the preview image generating unit 406 of the first embodiment, the image processing apparatus 310 has an image generating unit 1103 into which the print image generating unit 403 and the preview image generating unit 406 are integrated. The image processing apparatus 310 further has a luminance normalizing unit 1110. A print output unit 1104 and a preview image outputting unit 1107 are configured to perform processing based on data outputted from the luminance normalizing unit 1110.

In the present embodiment, as in the first embodiment, a maximum luminance of an HDR image obtained by the image obtaining unit 401 is set at 1000 cd/m². Furthermore, a lighting luminance obtained by the lighting luminance obtaining unit 402 is also set at 400 cd/m² like the first embodiment.

The image generating unit 1103 generates an image for printing and for previewing. As described in the first embodiment, since the obtained HDR image data has a maximum luminance of 1000 cd/m², the print image generating unit 403 performs dynamic-range compression in accordance with the obtained lighting luminance of 400 cd/m². The D-range compression is performed as described in the first embodiment.

The luminance normalizing unit 1110 performs normalization on the image generated by the image generating unit 1103, on which D-range compression has been performed. In the image generating unit 1103, an image having a maximum luminance of 400 cd/m² is generated. Incidentally, a typical printer and an SDR monitor cannot accept data having a maximum luminance of 400 cd/m². For this reason, in the present embodiment, the luminance normalizing unit 1110 performs normalization on the entire image so that a color having a luminance of 0 cd/m² satisfies RGB=0 and, a color having a luminance of 400 cd/m² satisfies RGB=255. In other words, the luminance normalizing unit 1110 performs normalization on the entire image to obtain a unit luminance used in the typical printer and the SDR monitor.

The print output unit 1104 causes the printer 320 to perform printout by using the image data normalized by the luminance normalizing unit 1110. Since the normalized image is printed, if the printed product is observed in lighting having an observation lighting luminance of 400 cd/m², the printed product having an optimized luminance of 400 cd/m² can be observed.

The preview image outputting unit 1107 performs previewing of the image generated by the image generating unit 1103. The typical monitor uses the RGB data as an input. In the monitor luminance changing unit 405, since a maximum luminance that the monitor 330 uses has been changed to 400 cd/m², the data satisfying RGB=255 is configured to be displayed as an image having a luminance of 400 cd/m².

As described above, in the present embodiment, by normalizing the luminance by using the luminance normalizing unit 1110, it is possible to input data after compression also to the typical printer and the SDR monitor, allowing for printing and previewing. Furthermore, the compression processing can be shared among printing and previewing.

Third Embodiment

In the present embodiment, an aspect of previewing with a normal monitor luminance (about 100 cd/m²) without changing a monitor luminance will be described. In the second embodiment, a description has been given on the example in which the monitor luminance changing unit 405 changes the luminance of the monitor 330 in accordance with the lighting luminance obtained by the lighting luminance obtaining unit 402. In this example, the luminance of the monitor 330 is kept at a normal monitor luminance (about 100 cd/m²) without changing it to the lighting luminance, and the normalized image normalized by the luminance normalizing unit 1110 is displayed on the monitor 330. In this case, a visual appearance of the printed product printed by the print output unit 1104 as viewed in normal lighting (about 100 cd/m$^2$) can be previewed on the monitor. Although the printed product is created for high-luminance lighting, there may be a use case that it is desired to check on the preview how the printed product looks in normal lighting. The present embodiment is useful in such a case.

The present embodiment will be described with reference to FIG. 6B and FIG. 6C. With reference to FIG. 6B, the image 605 has been described as representing a visual appearance of the printed product as viewed in a lighting luminance of 400 cd/m$^2$. With reference to FIG. 6C, a visual appearance of a printed product for high-luminance lighting as viewed in normal lighting (about 100 cd/m$^2$) will be described. An image 609 represents a visual appearance of a printed product corresponding to FIG. 6B as viewed in a lighting luminance of 100 cd/m$^2$. Since the lighting luminance is 100 cd/m$^2$, an area 610, which is the lightest part of the image, has a luminance of 100 cd/m$^2$. Since the image looks dark as a whole, an area 611 has a luminance of 75 cd/m$^2$ and an area 612 has a luminance of 13.5 cd/m$^2$. By previewing on the monitor with a luminance of 100 cd/m$^2$, the same state can be preview-displayed also on the monitor.

The image processing apparatus 310 of the present embodiment is configured to be capable of setting two preview modes: a preview mode for normal lighting and a preview mode for observation environment lighting. Switching between these modes is available according to a user instruction. In the case of the preview mode for normal lighting, the monitor luminance changing unit 405 sets the luminance of the monitor 330 to a normal luminance. In the case of the preview mode for observation environment lighting, the monitor luminance changing unit 405 sets the luminance of the monitor 330 to the same luminance as the observation lighting luminance, and displays the normalized data on the monitor. In this manner, by switching the luminance of the monitor 330 while the preview image is displayed, it is possible to compare the case of exhibiting with a normal lighting luminance and the case of exhibiting with a lighting luminance in high-luminance lighting. Therefore, an effect of printing for high-luminance lighting can be more recognizable on the monitor 330.

Fourth Embodiment

The present embodiment is an aspect relating to the timing of changing the luminance of the monitor 330. In the above-described embodiments, a lighting luminance in an exhibition environment, in which a printed product is exhibited, is assumed to be higher as compared to a normal luminance. Since the preview image in high-luminance lighting is displayed also on the monitor 330, a monitor luminance is also a high luminance. Looking at the high-luminance monitor for a long period of time would produce various effects such as eye fatigue. Therefore, the present embodiment performs processing to change the luminance of the monitor 330 only in a case of high-luminance lighting preview and to reset the luminance of the monitor 330 after finishing the high-luminance preview. That is, in a case when a user inputs an instruction to cancel a high-luminance preview mode, the processing to reset the luminance of the monitor 330 is performed. Alternatively, in a case when a user inputs a print instruction, the processing to reset the luminance of the monitor 330 may be performed. Further, a predetermined timer may be set and at a point when a predetermined period of time has elapsed for the high-luminance preview, the processing to reset the luminance to the original luminance may be performed. In this manner, changing the luminance only in the high-luminance lighting preview and resetting the luminance after finishing the high-luminance preview allow a user to reduce eye fatigue, or the like. In the case of resetting the luminance of the monitor 330, the monitor luminance changing unit 405 may store the luminance before changed to a high luminance and output to the monitor 330 an instruction to reset the luminance to the luminance before changed. Alternatively, the luminance may be controlled to decrease in stages to the luminance before a change.

Fifth Embodiment

In the above-described embodiments, the example in which the preview display can be switched has been described. The present embodiment is an aspect of arranging and displaying both of a result of preview in normal lighting and a result of preview in high-luminance lighting.

By arranging and displaying the results, it is possible to compare the case of exhibiting with a normal lighting luminance and the case of exhibiting with a lighting luminance in high-luminance lighting at the same time, and an effect of printing for high-luminance lighting becomes more recognizable. It should be noted that, in a case when a display area on one monitor 330 can be divided into a plurality of areas and a luminance can be changed for each area, images may be arranged and displayed on one monitor 330. Alternatively, a system may have a plurality of monitors 330, and a monitor for normal lighting and a monitor for high-luminance lighting may be arranged.

Sixth Embodiment

In the above-described embodiments, the example in which the maximum luminance that the monitor 330 can use is 400 cd/m$^2$ has been described. In the example, it is assumed that a typical monitor is used with a luminance of about 100 cd/m$^2$. For this reason, depending on the type of monitor, assuming that an observation environment has a lighting luminance of 400 cd/m$^2$ as in the first embodiment, there may be a case when a monitor luminance cannot be increased to the same level (i.e., about 320 to 480 cd/m$^2$).

In the present embodiment, even in a case of using a monitor that cannot necessarily output the same level of luminance as the lighting luminance in the observation environment, the monitor luminance is set higher than a normally used luminance (about 100 cd/m$^2$). Every monitor can adjust its luminance. In a case when, relative to the currently used luminance, a luminance higher than that is specified as the observation lighting luminance, even a slightly higher luminance would increase the level of matching across visual appearances. In this manner, even in a case when a monitor luminance cannot be increased to the same level as the observation lighting luminance, setting a monitor luminance higher than a normal luminance allows increase in a visual effect in previewing.

Seventh Embodiment

In the above-described embodiments, the aspect in which the image obtained by the image obtaining unit 401 is the HDR image has been described. In the present embodiment, an aspect in which an image obtained by the image obtaining unit 401 is a normal standard dynamic-range image (SDR image) will be described.

A technique for expanding a D range is also widely known in addition to the technique for compressing a D range. In the above-described embodiments, an aspect may be employed in which the print image generating unit 403, the preview image generating unit 406, and the image generating unit 1103 may perform D-range expansion processing, not D-range compression, and generate a print image and a preview image. According to the present embodiment, even in a case when an input image is not an HDR image but an SDR image, printing suitable for high-luminance lighting is available by expanding the D range, as well as previewing.

Other Embodiments

In the above-described embodiments, a description has been given on the aspect in which the image processing apparatus 310 can generate an image for the monitor 330 and change the luminance of the monitor 330. These processes may be achieved by different apparatuses. For example, an aspect may be employed in which there is provided a display control apparatus for controlling the change of the luminance of the monitor 330 according to the obtaining of a lighting luminance of an observation environment, and the image processing apparatus 310 generates an image for the monitor 330 according to the lighting luminance of the observation environment and outputs it to the monitor 330. That is, an aspect may be employed in which the image processing apparatus 310 does not change the luminance of the monitor 330, but a different apparatus changes the luminance of the monitor 330.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
(A) one or more memories storing instructions; and
(B) one or more processors executing the instructions:
 (a) to obtain image data for displaying on a display device an image corresponding to a printed product observed in a predetermined observation environment;
 (b) to obtain a lighting luminance in the predetermined observation environment;
 (c) to set a maximum luminance to be displayed in the display device according to the obtained lighting luminance;
 (d) to convert the obtained image data according to the obtained lighting luminance; and
 (e) to output the converted image data to the display device whose maximum luminance to be displayed has been set according to the obtained lighting luminance,
 wherein an absolute value of a difference between a perceptual quantization (PQ) value corresponding to the maximum luminance to be set and a perceptual quantization (PQ) value corresponding to the obtained lighting luminance is within a predetermined value.

2. The image processing apparatus according to claim 1, wherein the instruction to convert includes converting the obtained image data such that a range of a luminance of the obtained image data conforms to a range according to the obtained lighting luminance.

3. The image processing apparatus according to claim 1, wherein the instruction to convert includes converting the obtained image data such that a maximum luminance of the obtained image data conforms to the obtained lighting luminance.

4. The image processing apparatus according to claim 1, wherein the obtained image data is RAW data, and
 wherein the instruction to convert includes performing conversion to compress a range of a luminance of the obtained image data.

5. The image processing apparatus according to claim 4, wherein the instruction to convert includes converting the obtained image data such that a compression rate of a dark part of the obtained image data is less than a compression rate of a light part.

6. The image processing apparatus according to claim 1, wherein the obtained image data is data on an SDR image, and
 wherein the instruction to convert includes performing conversion to expand a range of a luminance of the obtained image data.

7. The image processing apparatus according to claim 1, wherein the obtained lighting luminance is higher than a luminance of a standard light source.

8. The image processing apparatus according to claim 1, wherein the instruction to convert includes normalizing the converted image data according to a unit luminance used by the display device, and
 wherein the instruction to output includes outputting the normalized image data to the display device.

9. The image processing apparatus according to claim 8, wherein the image processing apparatus is capable of switching a luminance of the display device between a first mode and a second mode, and
 wherein the instruction to set includes setting, in a case of the first mode, the maximum luminance to be displayed in the display device according to the obtained lighting luminance, and setting, in a case of the second mode, the maximum luminance to be displayed in the display device to a luminance of a standard light source.

10. The image processing apparatus according to claim 9, wherein the image processing apparatus is capable of switching the mode in a case when the display device is displaying based on the normalized image data.

11. The image processing apparatus according to claim 9, wherein, in a case when the first mode is cancelled by a user instruction or a predetermined period of time has elapsed, the instruction to set includes resetting the maximum luminance to be displayed in the display device to a luminance before switching to the first mode.

12. The image processing apparatus according to claim 1, wherein the instruction to set includes setting the maximum luminance to be displayed in the display device to a luminance higher than a current luminance in a case when a maximum luminance to be displayed in the display device cannot be changed to a luminance according to the obtained lighting luminance.

13. The image processing apparatus according to claim 8, wherein the display device is capable of adjusting a luminance for each area,
wherein the instruction to set includes setting a maximum luminance of only a first area according to the obtained lighting luminance, and
wherein the instruction to output includes outputting an instruction to display the normalized image data on both of the first area and a second area different from the first area of the display device.

14. The image processing apparatus according to claim 8, wherein the image processing apparatus is capable of individually changing a maximum luminance to be displayed in a first display device and a maximum luminance to be displayed in a second display device, and the instruction to set includes setting the maximum luminance of only the first display device according to the obtained lighting luminance, and
wherein the instruction to output includes outputting the normalized image data to both of the first display device and the second display device.

15. The image processing apparatus according to claim 1, wherein the one or more processors further execute an instruction to output the converted image data to a printing device.

16. The image processing apparatus according to claim 15, wherein, after the converted image is displayed on the display device and a predetermined instruction is inputted, the instruction to output the converted image data is performed.

17. A control apparatus for controlling a display device that displays an image, the apparatus comprising:
(A) one or more memories storing instructions; and
(B) one or more processors executing the instructions:
  (a) to obtain a lighting luminance in a predetermined observation environment in which a printed product is observed; and
  (b) to set a maximum luminance to be displayed in the display device according to the obtained lighting luminance,
  wherein an absolute value of a difference between a perceptual quantization (PQ) value corresponding to the maximum luminance to be set and a perceptual quantization (PQ) value corresponding to the obtained lighting luminance is within a predetermined value.

18. An image processing method comprising:
a first obtaining step of obtaining image data for displaying on a display device an image corresponding to a printed product observed in a predetermined observation environment;
a second obtaining step of obtaining a lighting luminance in the predetermined observation environment;
a setting step of setting a maximum luminance to be displayed in the display device according to the lighting luminance obtained in the second obtaining step;
a converting step of converting the image data obtained in the first obtaining step according to the lighting luminance obtained in the second obtaining step; and
an outputting step of outputting the image data converted in the converting step to the display device whose maximum luminance to be displayed has been set in the setting step,
wherein, an absolute value of a difference between a perceptual quantization (PQ) value corresponding to the maximum luminance to be set and a perceptual quantization (PQ) value corresponding to the obtained lighting luminance is within a predetermined value.

19. A control method for controlling a display device that displays an image, the method comprising:
an obtaining step of obtaining a lighting luminance in a predetermined observation environment in which a printed product is observed; and
a setting step of setting a maximum luminance to be displayed in the display device according to the lighting luminance obtained in the obtaining step,
wherein an absolute value of a difference between a perceptual quantization (PQ) value corresponding to the maximum luminance to be set and a perceptual quantization (PQ) value corresponding to the obtained lighting luminance is within a predetermined value.

20. A non-transitory computer-readable storage medium storing a program that causes a computer to perform an image processing method for displaying on a display device an image, the image processing method comprising:
a first obtaining step of obtaining image data;
a second obtaining step of obtaining a lighting luminance in a predetermined observation environment in which a printed product is observed;
a setting step of setting a maximum luminance to be displayed in the display device according to the lighting luminance obtained in the second obtaining step;
a converting step of converting the image data obtained in the first obtaining step according to the lighting luminance obtained in the second obtaining step; and
an outputting step of outputting the image data converted in the converting step to the display device whose maximum luminance to be displayed has been set in the setting step,
wherein an absolute value of a difference between a perceptual quantization (PQ) value corresponding to the maximum luminance to be set and a perceptual quantization (PQ) value corresponding to the obtained lighting luminance is within a predetermined value.

21. A non-transitory computer-readable storage medium storing a program that causes a computer to perform a control method for controlling a display device that displays an image, the control method comprising:
an obtaining step of obtaining a lighting luminance in a predetermined observation environment in which a printed product is observed; and
a setting step of setting a maximum luminance to be displayed in the display device according to the lighting luminance obtained in the obtaining step, wherein an absolute value of a difference between a perceptual quantization (PQ) value corresponding to the maximum luminance to be set and a perceptual quantization (PQ) value corresponding to the obtained lighting luminance is within a predetermined value.

22. The image processing apparatus according to claim 1, wherein the instruction to set includes changing the maximum luminance to be displayed in the display device from an already set luminance to the obtained luminance.

23. The image processing apparatus according to claim 22, wherein the already set luminance is observation luminance assumed in normal lighting and the obtained luminance is observation luminance assumed in high-luminance lighting.

24. The image processing apparatus according to claim 1, wherein the instruction to set includes setting the maximum luminance to be displayed in the display device such that the maximum luminance conforms to the obtained lighting luminance.

25. The image processing apparatus according to claim 1, wherein the predetermined value is 0.02.

26. The control apparatus according to claim 17, wherein the predetermined value is 0.02.

27. The image processing apparatus method to claim 18, wherein the predetermined value is 0.02.

28. The control method according to claim 19, wherein the predetermined value is 0.02.

29. The non-transitory computer readable storage medium according to claim 20, wherein the predetermined value is 0.02.

30. The non-transitory computer readable storage medium according to claim 21, wherein the predetermined value is 0.02.

* * * * *